(12) United States Patent
Matsushita et al.

(10) Patent No.: US 10,830,966 B2
(45) Date of Patent: Nov. 10, 2020

(54) OPTICAL CONNECTOR MANUFACTURING METHOD

(71) Applicant: SUMITOMO ELECTRIC INDUSTRIES, LTD., Osaka (JP)

(72) Inventors: Naoki Matsushita, Yokohama (JP); Takuji Nagashima, Yokohama (JP); Tetsu Morishima, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 258 days.

(21) Appl. No.: 15/920,558

(22) Filed: Mar. 14, 2018

(65) Prior Publication Data

US 2018/0284361 A1  Oct. 4, 2018

(30) Foreign Application Priority Data

Mar. 28, 2017 (JP) .................. 2017-063646

(51) Int. Cl.
   *G02B 6/38* (2006.01)
   *G02B 6/02* (2006.01)
(52) U.S. Cl.
   CPC ....... *G02B 6/3885* (2013.01); *G02B 6/02042* (2013.01); *G02B 6/3882* (2013.01); *G02B 6/3893* (2013.01)

(58) Field of Classification Search
   CPC .............. G02B 6/3885; G02B 6/02042; G02B 6/3882; G02B 6/3893
   USPC ........ 385/97, 53, 58, 60, 64, 72, 75, 77, 82; 29/857, 825, 592.1
   See application file for complete search history.

(56) References Cited

U.S. PATENT DOCUMENTS 4,708,433 A * 11/1987 Kakii ................ B29C 45/14467
                                                  385/54
7,048,447 B1 * 5/2006 Patel .................... G02B 6/3885
                                                  385/59

FOREIGN PATENT DOCUMENTS

JP       2013-238692 A     11/2013

* cited by examiner

*Primary Examiner* — Peter Dungba Vo
*Assistant Examiner* — Azm A Parvez
(74) *Attorney, Agent, or Firm* — Faegre Drinker Biddle & Reath LLP

(57) ABSTRACT

An optical connector manufacturing method includes inserting a protrusion of a fixing jig into a positioning hole in an end face of a cladding of an optical fiber and restraining rotation of the optical fiber, the positioning hole extending in an optical axis direction, the optical fiber being inserted in a through hole in a connector ferrule and protruding from an end face of the connector ferrule; and securing the optical fiber to the connector ferrule, with the protrusion of the fixing jig inserted in the positioning hole.

11 Claims, 7 Drawing Sheets

OPTICAL CONNECTOR MANUFACTURING METHOD

BACKGROUND OF THE INVENTION

Field of the Invention

The present invention relates to an optical connector manufacturing method.

Description of the Related Art

Japanese Unexamined Patent Application Publication No. 2013-238692 discloses a method for manufacturing a multi-core optical fiber connector. In this manufacturing method, a multi-core optical fiber (MCF) secured to a ferrule is positioned such that it faces a master MCF secured to a master MCF connector, and a center position of the MCF is aligned with that of the master MCF. Then, while light is being guided to cores of one of the MCF and the master MCF, the ferrule is rotated relative to the master MCF connector, and light emitted from cores of the other of the MCF and the master MCF is detected. The ferrule is retained at a position that maximizes light intensity.

SUMMARY OF THE INVENTION

An object of the present invention is to provide an optical connector manufacturing method that facilitates positioning of optical fibers.

An optical connector manufacturing method according to an aspect of the present invention includes of inserting a protrusion of a fixing jig into a positioning hole in an end face of a cladding of an optical fiber and restraining rotation of the optical fiber, the positioning hole extending in an optical axis direction, the optical fiber being inserted in a through hole in a connector ferrule and protruding from an end face of the connector ferrule; and securing the optical fiber to the connector ferrule, with the protrusion of the fixing jig inserted in the positioning hole.

In the optical connector manufacturing method according to another aspect of the present invention, a taper angle of a tip of the protrusion may range from 10° to 130°, preferably from 90° to 130°. The fixing jig may have a positioning portion designed for positioning with respect to the connector ferrule. The optical connector manufacturing method according to another aspect of the present invention may further include, before the restraining rotation of the optical fiber, aligning the optical fiber while observing the optical fiber from a side face thereof. The connector ferrule may be a multi-fiber connector ferrule having a plurality of through holes, and the fixing jig may have a plurality of protrusions corresponding to respective positions of a plurality of optical fibers inserted in the plurality of through holes.

The present invention provides an optical connector manufacturing method that facilitates positioning of optical fibers.

DESCRIPTION OF THE PREFERRED EMBODIMENTS

Examples of an optical connector manufacturing method according to the present invention will now be described with reference to the drawings. Note that the present invention is not limited to the examples described below. The present invention is defined by the appended claims, and is intended to include all modifications within the meanings and scopes equivalent to the claims.

The method described in Japanese Unexamined Patent Application Publication No. 2013-238692 requires positioning and rotational alignment of two multi-core optical fibers (MCFs) butted together. Positioning of MCFs is not easy, and there is room for improvement in workability.

Figure 1:
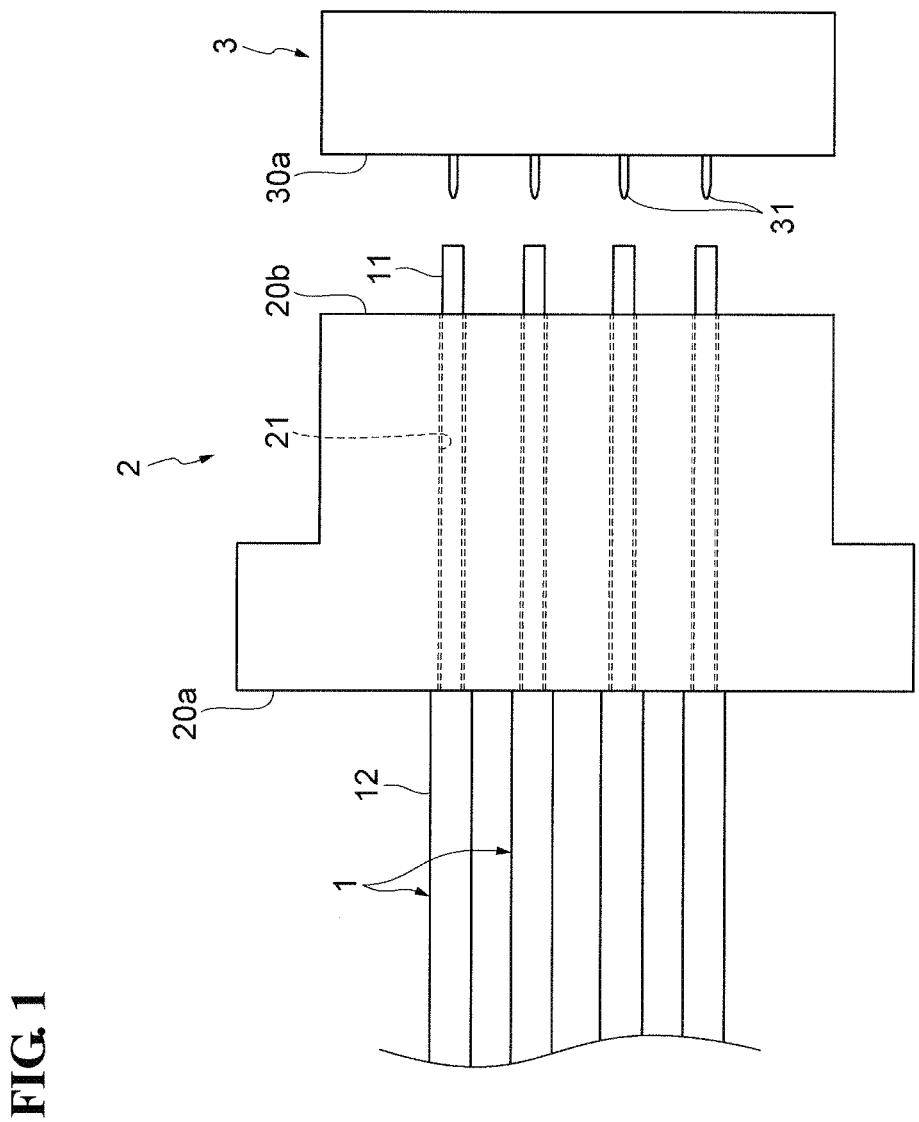
FIG. 1 is a front view illustrating optical fibers inserted in through holes in a connector ferrule, and a fixing jig placed opposite the optical fibers and used in an embodiment of the present invention.

FIG. 1 is a front view illustrating a plurality of optical fibers (MCFs) 1 inserted in respective through holes in a connector ferrule 2, and a fixing jig 3 placed opposite the MCFs 1 and used in an optical connector manufacturing method according to an embodiment of the present invention. The manufacturing method of the present embodiment uses the fixing jig 3 to determine the positions of the MCFs 1 in the connector ferrule 2 about respective axes of the MCFs 1.

Figure 2:
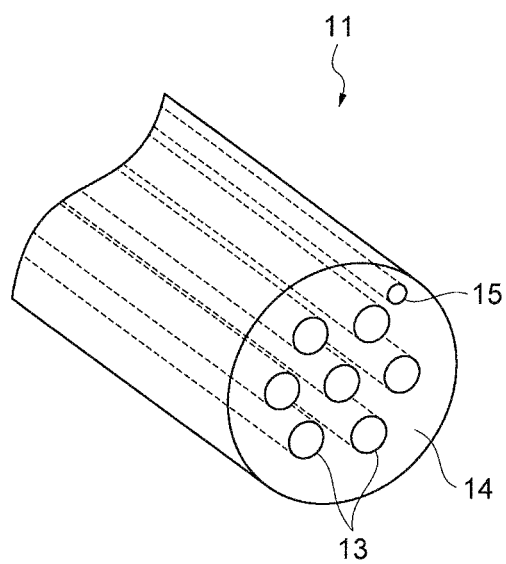
FIG. 2 is a schematic perspective view of a glass part of a multi-core optical fiber.

The MCFs 1 each include a glass part 11 and a protective coating 12 extending over the periphery of the glass part 11. FIG. 2 is a schematic perspective view of the glass part 11 of the MCF 1. The glass part 11 includes a plurality of cores 13 that extend along a predetermined direction, and a cladding 14 that covers the cores 13 together. The cladding 14 is provided with a positioning hole 15 that extends from an end face of the cladding 14 along the optical axis direction of the glass part 11. The positioning hole 15 is used for positioning using the fixing jig 3 (described below). The cross section of the positioning hole 15 is preferably sized to accommodate a corresponding one of protrusions 31 of the fixing jig 3. Specifically, when the MCF 1 with a diameter of 125 μm is provided with the positioning hole 15, the diameter of the positioning hole 15 preferably ranges from about 10 μm to about 20 μm.

Referring back to FIG. 1, the connector ferrule 2 has a plurality of through holes 21 into which the respective glass parts 11 of the MCFs 1 can be inserted. The connector ferrule 2 is a so-called multi-fiber connector, in which the through holes 21 extend parallel to each other. In an end face 20a and an end face 20b of the connector ferrule 2, the end portions of the through holes 21 are linearly arranged at predetermined intervals. The glass parts 11 with the protective coatings 12 removed are inserted into the respective through holes 21. The optical connector is manufactured by securing the glass parts 11 in the through holes 21 in the connector ferrule 2 when they reach predetermined positions about axes thereof.

In FIG. 1, the glass parts 11 of the MCFs 1 are in the respective through holes 21 in the connector ferrule 2. Each of the glass parts 11 is inserted through an end of a corresponding one of the through holes 21 in the end face 20a of the connector ferrule 2. Then an end portion of the glass part 11 protrudes from the other end of the through hole 21 in the end face 20b of the connector ferrule 2 opposite the end face 20a.

Figure 3:
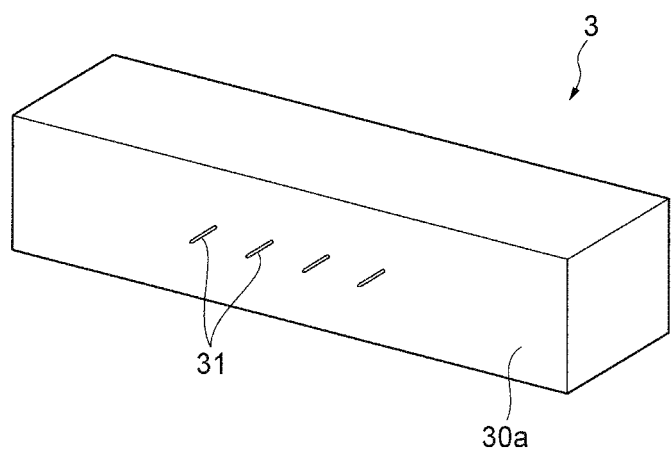
FIG. 3 is a schematic perspective view of the fixing jig used in the embodiment of the present invention.

FIG. 3 is a schematic perspective view of the fixing jig 3 used in the embodiment of the present invention. As illustrated in FIGS. 1 and 3, the fixing jig 3 has a principal surface 30a facing the end face 20b of the connector ferrule 2. The principal surface 30a of the fixing jig 3 has the protrusions 31 that are designed for positioning, and are equal in number to the through holes 21 in the connector ferrule 2. The protrusions 31 of the fixing jig 3 are arranged in such a manner as to correspond to the respective positions of the positioning holes 15 determined by rotational alignment of the glass parts 11 in the end face 20b of the connector ferrule 2. That is, the protrusions 31 are linearly arranged in the same manner as the end portions of the through holes 21 in the end face 20b of the connector ferrule 2. A distance between adjacent ones of the protrusions 31 corresponds to a distance between adjacent ones of the glass parts 11 of the MCFs 1 protruding from the end face 20b of the connector ferrule 2.

The protrusions 31 are not particularly limited in shape, but preferably have a diameter corresponding to the size of each positioning hole 15. For example, the protrusions 31 have a diameter of about 20 μm. The protrusions 31 are each preferably tapered at a tip thereof. The taper angle (i.e., the angle of a tapered portion with respect to a direction in which a side face of the protrusion 31 extends) preferably ranges from 10° to 130°. When the taper angle of the tip of the protrusion 31 is 130° or less, the protrusion 31 can be smoothly inserted into the positioning hole 15 in the corresponding glass part 11. When the taper angle of the tip of the protrusion 31 is 10° or more, preferably 90° or more, it is possible to reduce a degradation in the stiffness of the tip of the protrusion 31 and prevent the protrusion 31 from being damaged.

Figure 4:
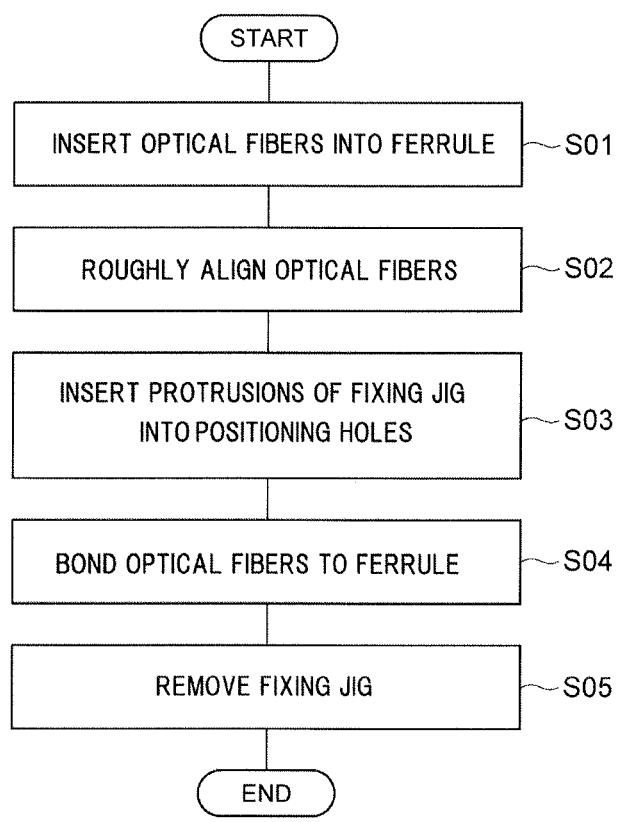
FIG. 4 is a block diagram explaining an optical connector manufacturing method according to the embodiment of the present invention.

FIG. 4 is a block diagram explaining the optical connector manufacturing method according to the embodiment of the present invention. First, the glass parts 11 of the MCFs 1 are inserted into the respective through holes 21 in the connector ferrule 2 (S01). As illustrated in FIG. 1, with the protective coatings 12 of the MCFs 1 removed, the glass parts 11 are inserted from the end face 20a of the connector ferrule 2 into the through holes 21. The tips of the glass parts 11 inserted into the through holes 21 protrude from the end face 20b of the connector ferrule 2.

Next, the glass parts 11 of the MCFs 1 in the through holes 21 are roughly aligned about the axes of the glass parts 11 (S02). The method of roughly aligning the glass parts 11 is not particularly limited, and a publicly known method may be used. The rotational alignment of the glass parts 11 may be performed while observing the MCFs 1 from side faces of the glass parts 11, as illustrated in FIG. 1. The rotational alignment may be performed while observing the arrangement of the cores 13 from the end faces of the glass parts 11, but this requires that the fixing jig 3 be moved from the position illustrated in FIG. 1. When the rotational alignment is performed while observing the MCFs 1 from the side faces of the glass parts 11, there is no need to move the fixing jig 3 from the position illustrated in FIG. 1. This improves accuracy in positioning the optical fibers after insertion of the protrusions 31 into the glass parts 11.

Figure 5:
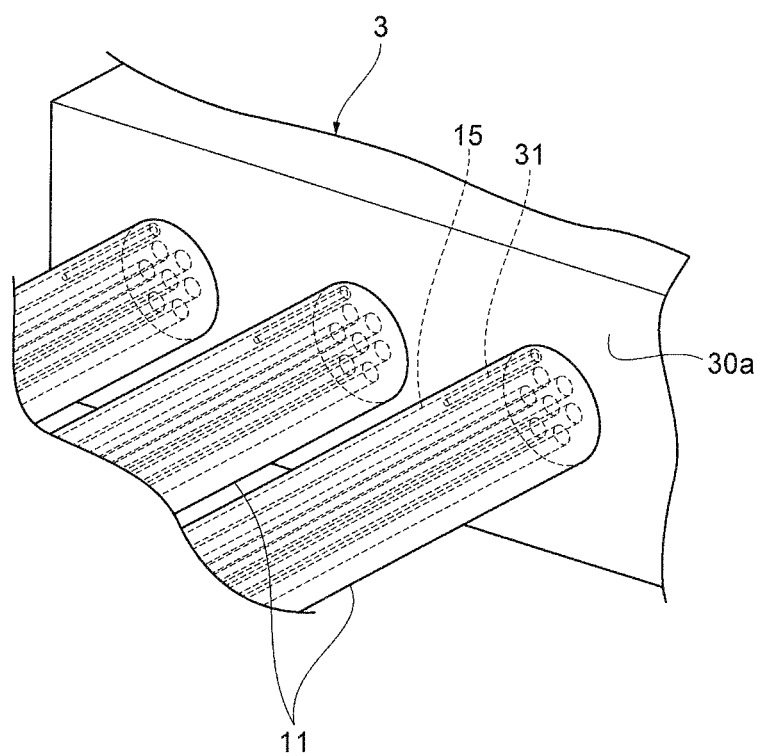
FIG. 5 is a perspective view illustrating how protrusions of the fixing jig illustrated in FIG. 3 are inserted in positioning holes in the glass parts of multi-core optical fibers.

Next, the protrusions 31 of the fixing jig 3 are inserted into the respective positioning holes 15 in the glass parts 11 (S03). FIG. 5 is a perspective view illustrating the protrusions 31 inserted in the positioning holes 15 in the glass parts 11. When the glass parts 11 are roughly aligned and the cores 13 of each glass part 11 become close to desired positions about the axis of the glass part 11, the fixing jig 3 is moved to bring the principal surface 30a thereof close to the end portions of the glass parts 11. Then, the protrusions 31 of the fixing jig 3 are inserted into the respective positioning holes 15 in the glass parts 11. The positions of the glass parts 11 about the axes thereof may be fine-adjusted during insertion of the protrusions 31 into the positioning holes 15. Rotation of the glass parts 11 is thus restrained, and the positions of the glass parts 11 with respect to the connector ferrule 2 are determined.

With the rotation of the glass parts 11 restrained by the fixing jig 3, the outer peripheries of the glass parts 11 in the through holes 21 are bonded to the connector ferrule 2 (S04). This secures the positions of the glass parts 11 relative to the connector ferrule 2.

Last, the fixing jig 3 is removed from the glass parts 11 of the MCFs 1 secured to the connector ferrule 2 (S05). After the glass parts 11 protruding from the end face 20b of the connector ferrule 2 are ground as necessary, the process of manufacturing the optical connector ends.

As described above, in the optical connector manufacturing method according to the present embodiment, the rotation of the glass parts 11 is restrained by inserting the protrusions 31 of the fixing jig 3 into the positioning holes 15 in the end faces of the claddings 14 of the glass parts 11 of the optical fibers. Then, with the rotation of the glass parts 11 restrained by the fixing jig 3, the glass parts 11 are secured to the connector ferrule 2.

The optical connector manufacturing method of the related art requires fine adjustment of the position of an optical fiber about the axis thereof. A positioning method used in this case involves, for example, causing light to propagate through cores of the optical fiber. However, due to alignment, it is not easy to adjust the position of the optical fiber about the axis thereof. Also, there is room for improvement in technique that involves, after determining the position about the axis, accurately securing the optical fiber to the ferrule, with the optical fiber retained at the determined position. In contrast, the optical connector manufacturing method according to the present embodiment facilitates positioning of optical fibers, particularly positioning about their axes.

As described in the embodiment, in manufacture of a multi-fiber connector, the glass parts 11 inserted into the connector ferrule 2 using the fixing jig 3 can be positioned and secured at the same time. This requires less labor-hours than individually positioning the optical fibers inserted in the connector ferrule 2.

The glass parts 11 may be individually aligned even when the connector ferrule 2 is a multi-fiber connector ferrule as in the embodiment described above. That is, the number of the protrusions 31 of the fixing jig 3 does not necessarily need to correspond to the number of optical fibers inserted into the connector ferrule 2. For example, when the fixing jig 3 has one protrusion 31, the glass parts 11 inserted in the connector ferrule 2 are aligned one by one, and one glass part 11 is positioned and secured using the fixing jig 3. By repeating this step, the glass parts 11 are individually positioned and secured.

Figure 6:
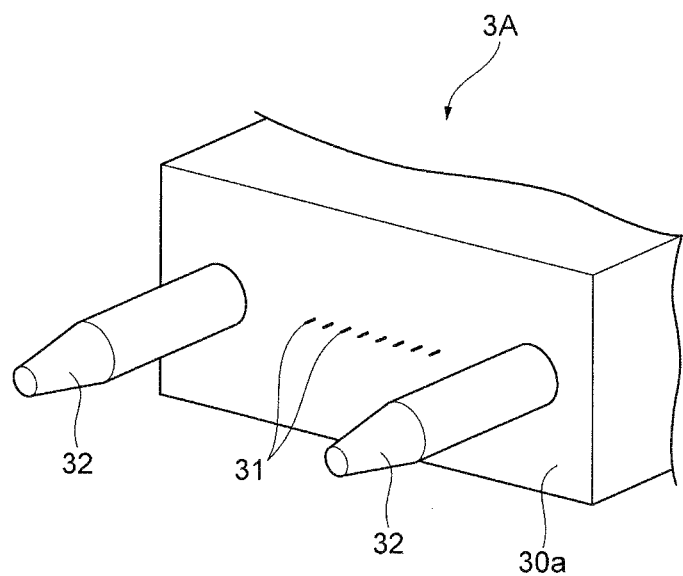
FIG. 6 is a perspective view of a fixing jig used in an optical connector manufacturing method according to a modification of the present invention.

FIG. 6 is a perspective view of a fixing jig 3A used in an optical connector manufacturing method according to a modification. Aside from the protrusions 31 used for positioning the optical fibers, the principal surface 30a of the fixing jig 3A may have pins (protrusion) 32 thereon. The pins 32 serve as positioning portions used for positioning with respect to a connector ferrule 2A.

Figure 7:
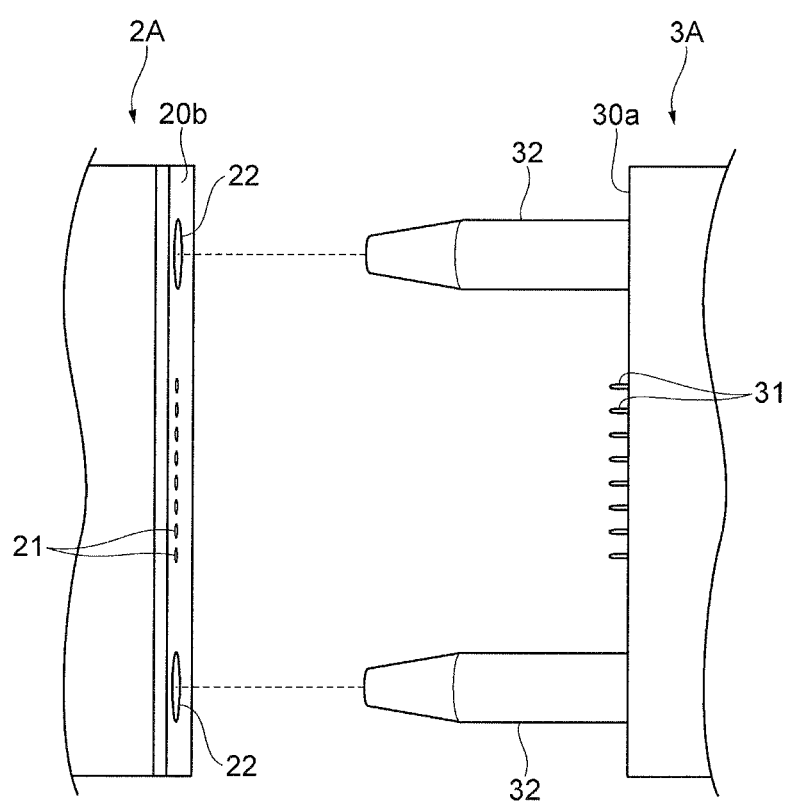
FIG. 7 illustrates the fixing jig of FIG. 6 and a connector ferrule arranged side by side.

FIG. 7 illustrates the fixing jig 3A and the connector ferrule 2A arranged side by side. The end face 20b of the connector ferrule 2A has openings 22 that correspond to the respective pins 32 of the fixing jig 3A. When the optical fibers inserted in the through holes 21 in the connector ferrule 2A are positioned using the protrusions 31 of the fixing jig 3A, inserting the pins 32 of the fixing jig 3A into the respective openings 22 in the connector ferrule 2A allows positioning of the connector ferrule 2A and the fixing jig 3A.

When the fixing jig 3A has positioning portions for positioning with respect to the connector ferrule 2A, the fixing jig 3A can be easily positioned at a desired position with respect to the connector ferrule 2A. This prevents relative misalignment between the fixing jig 3A and the connector ferrule 2A, and makes it possible to achieve more desirable positioning of optical fibers.

The shape of the positioning portions of the fixing jig 3A is not limited to that illustrated in FIGS. 6 and 7. For example, as positioning portions of the fixing jig 3A for positioning with respect to the connector ferrule 2A, the principal surface 30a or its surrounding region of the fixing jig 3A may have raised and recessed portions that follow the contour of the end face 20b of the connector ferrule 2A. That is, the positioning portions of the fixing jig 3A may be of any shape as long as they are capable of retaining the position of the fixing jig 3A relative to the connector ferrule 2A, and may be changed as necessary.

The optical connector manufacturing method of the present invention is not limited to the embodiment described above. For example, the number and arrangement of the cores 13 of each MCF 1 may be appropriately changed. The present invention is applicable not only to MCFs, but also to single-core optical fibers. Each optical fiber does not necessarily need to include the protective coating 12 described in the embodiment. The shapes of the connector ferrule 2 and the fixing jig 3 may be appropriately changed.

What is claimed is:

1. An optical connector manufacturing method comprising:
   inserting a protrusion of a fixing jig into a positioning hole in an end face of a cladding of an optical fiber and restraining rotation of the optical fiber, the positioning hole extending in an optical axis direction, the optical fiber being inserted in a through hole in a connector ferrule and protruding from an end face of the connector ferrule; and
   securing the optical fiber to the connector ferrule, with the protrusion of the fixing jig inserted in the positioning hole, wherein
   the connector ferrule is a multi-fiber connector ferrule having a plurality of through holes; and
   the fixing jig has a plurality of protrusions corresponding to respective positions of a plurality of optical fibers inserted in the plurality of through holes.

2. The optical connector manufacturing method according to claim 1, wherein a taper angle of a tip of the protrusion ranges from 10° to 130°.

3. The optical connector manufacturing method according to claim 1, wherein a taper angle of a tip of the protrusion ranges from 90° to 130°.

4. The optical connector manufacturing method according to claim 1, wherein the fixing jig has a positioning portion designed for positioning with respect to the connector ferrule.

5. The optical connector manufacturing method according to claim 1, further comprising,
   before the restraining rotation of the optical fiber, aligning the optical fiber while observing the optical fiber from a side face thereof.

6. An optical connector manufacturing method comprising:
   inserting a protrusion of a fixing jig into a positioning hole in an end face of a cladding of an optical fiber and restraining rotation of the optical fiber, the positioning hole extending in an optical axis direction, the optical fiber being inserted in a through hole in a connector ferrule and protruding from an end face of the connector ferrule, the optical fiber being rotatable relative to the connector ferrule before inserting the protrusion of the fixing jig into the positioning hole;
   securing the optical fiber to the connector ferrule, with the protrusion of the fixing jig inserted in the positioning hole;
   removing the fixing jig from the optical fiber secured to the connector ferrule; and
   grinding an end face of the optical fiber protruding from the end face of the connector ferrule.

7. The optical connector manufacturing method according to claim 6, wherein a taper angle of a tip of the protrusion ranges from 10° to 130°.

8. The optical connector manufacturing method according to claim 6, wherein a taper angle of a tip of the protrusion ranges from 90° to 130°.

9. The optical connector manufacturing method according to claim 6, wherein the fixing jig has a positioning portion designed for positioning with respect to the connector ferrule.

10. The optical connector manufacturing method according to claim 6, further comprising, before the restraining rotation of the optical fiber, aligning the optical fiber while observing the optical fiber from a side face thereof.

11. The optical connector manufacturing method according to claim 6, wherein
   the connector ferrule is a multi-fiber connector ferrule having a plurality of through holes; and
   the fixing jig has a plurality of protrusions corresponding to respective positions of a plurality of optical fibers inserted in the plurality of through holes.

* * * * *